United States Patent [19]
Sloane

[11] Patent Number: 5,348,349
[45] Date of Patent: Sep. 20, 1994

[54] SPLINED SAFETY LOCK

[76] Inventor: Norman S. Sloane, 14633 Leahy Ave., Bellflower, Calif. 90706

[21] Appl. No.: 155,148

[22] Filed: Nov. 22, 1993

[51] Int. Cl.⁵ ............................................. F16L 55/00
[52] U.S. Cl. .................................... 285/92; 285/86
[58] Field of Search ....................... 285/81, 86, 91, 92

[56] References Cited

U.S. PATENT DOCUMENTS

| | | | |
|---|---|---|---|
| 3,201,149 | 8/1965 | Bragg | 285/86 |
| 4,693,498 | 9/1987 | Baugh et al. | 285/92 |
| 4,877,271 | 10/1989 | McCorkle et al. | 285/92 |
| 4,927,187 | 5/1990 | Sanford et al. | 285/92 |
| 5,083,819 | 1/1992 | Bynum | 285/92 |
| 5,094,491 | 3/1992 | Berghammer et al. | 285/92 |
| 5,127,674 | 7/1992 | Pouplier | 285/92 |
| 5,215,336 | 6/1993 | Worthing | 285/92 |
| 5,256,421 | 10/1992 | Chauvel | 285/92 |

FOREIGN PATENT DOCUMENTS

| | | | |
|---|---|---|---|
| 718790 | 9/1965 | Canada | 285/86 |
| 427660 | 5/1991 | European Pat. Off. | 285/92 |
| 3712955 | 11/1988 | Fed. Rep. of Germany | 285/92 |
| 624386 | 8/1949 | United Kingdom | 285/92 |

*Primary Examiner*—Eric K. Nicholson
*Attorney, Agent, or Firm*—Roger A. Marrs

[57] ABSTRACT

A safety retainer ring is disclosed herein for holding a shaped nut in position on a threaded nipple or the like, which includes an annular body having an internal bore configured adjacent one open end to conform with the shape of the nut and having an external raised row of projections, each having a hole therethrough for receiving a straight pin formed in a length of a safety clip. Internal splines are provided adjacent the other open end adapted to receive mating external splines carried on a collar of the nipple to prevent relative movement therebetween whereby the nut cannot back off from its threaded connection with the threaded nipple.

5 Claims, 1 Drawing Sheet

SPLINED SAFETY LOCK

BACKGROUND OF THE INVENTION

1. Field of the Invention

The present invention relates to retaining devices and, more particularly, to a novel retainer which, when used, prevents inadvertent movement between a nut and its mounting or support, such as a nipple installed in a fuel line system.

2. Brief Description of the Prior Art

In the past, it has been the conventional practice to employ couplings which, when connected together, serve as conduits for transmitting a fluid. In such systems as fuel lines, couplings are extremely important and assurance must be provided against inadvertent backing-off of coupling nuts so that fuel leakage will not occur. In situations such as high performance vehicles and race cars, excessive vibration oftentimes causes nuts in a threaded coupling to loosen and back-off from its sealed coupled position. In order to prevent such an occurrence, attempts have been made to drill special holes in the nut through which safety wire can be threaded and subsequently anchored to fixed supporting members. Such a situation requires that a hole be drilled through a suitable thickness in the nut which presents a problem since the drilling of a special hole is time-consuming and reduces the structural integrity of the coupling nut itself.

Furthermore, in situations where fixed supports are not available to which the safety wire can be anchored, even the drilling of a hole through the coupling nut itself would not be sufficient for eliminating loosening of the nut due to excessive vibration. Such vibration has a tendency to loosen the threaded engagement of the nut with the nipple in spite of the safety wire securement.

Therefore, a long-standing need has existed to provide a retaining means for holding a shaped nut in position with respect to a coupling situation, such as when a nipple is used where the nut will not back-off or loosen although the installation is subjected to severe vibrations. Such a means should not require the alteration or modification of the existing coupling members and, preferably, shall not interfere with the proper seating of the coupling members so as to maintain an effective seal to prevent leakage of fluids.

SUMMARY OF THE INVENTION

Accordingly, the above problems and difficulties are obviated by the present invention which provides a novel safety retaining ring comprising a ring-like body having an open-ended bore with a shaped section adapted to conform and fit over a shaped nut. The body includes an internal splined section adapted to slideably engage with external splines carried on a collar of the nipple. The body further includes a thickened portion about the shaped section defining a plurality of raised projections each of which is provided with an open-ended aperture. The raised projections are on the external side of the shaped section while the internal side of the projection matches the shape of the shaped nut. In one form, the nipple collar is provided with a plurality of external splines and the inner surface of the splined section of the retaining ring body includes a plurality of mateable splines intended to match and conform with the splines of the nipple collar. A safety clip incorporating a loop at one end passes through a selected aligned pair of apertures in the raised projections. A feature resides in the fact that the overall length of the retainer body is captured on the coupling nut and nipple collar so that the extremities of the retainer do not interfere with the coupling installation whereby proper sealing of the installation is assured without interference from the retainer ring.

Therefore, it is among the primary objects of for maintaining a shaped nut in position with respect to a coupling installation, particularly when installed in a fuel line system.

Another object of the present invention is to provide a simple retaining ring adapted to have a splined inner bore conformal with the splined shape of a coupling collar so that the nut is prevented from backing-off once the coupling has been completed.

Still another object of the present invention is to provide an inexpensive means for preventing decoupling of a two-piece coupling system employed in a volatile fuel line whereby the coupling members are form-fitted together preventing any looseness or back-off problems.

A further object resides in providing a retaining ring assembly having a 360° range of contact surface between coupling components, on splined and hexagon ends thereof, to prevent leakage.

Another object resides in the elimination of system contamination by covering access to the coupling threaded areas.

Another object involves a coupling which reduces maintenance time since visual inspection of the coupling joint is available.

A further object is to employ mated splines between coupling components enabling the nut to be locked in place within the minimum-to-maximum torque specifications.

Yet another object resides in providing a retainer ring having internal splines on one end and a plurality of flats on its other end which cooperate with coupling component splines and flats to maintain the coupling components in sealed torqued relationship.

Another object resides in a coupling assembly having a splined safety lock ring operable only in a rectilinear manner to tighten or loosen the sealed coupling relationship of the components.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
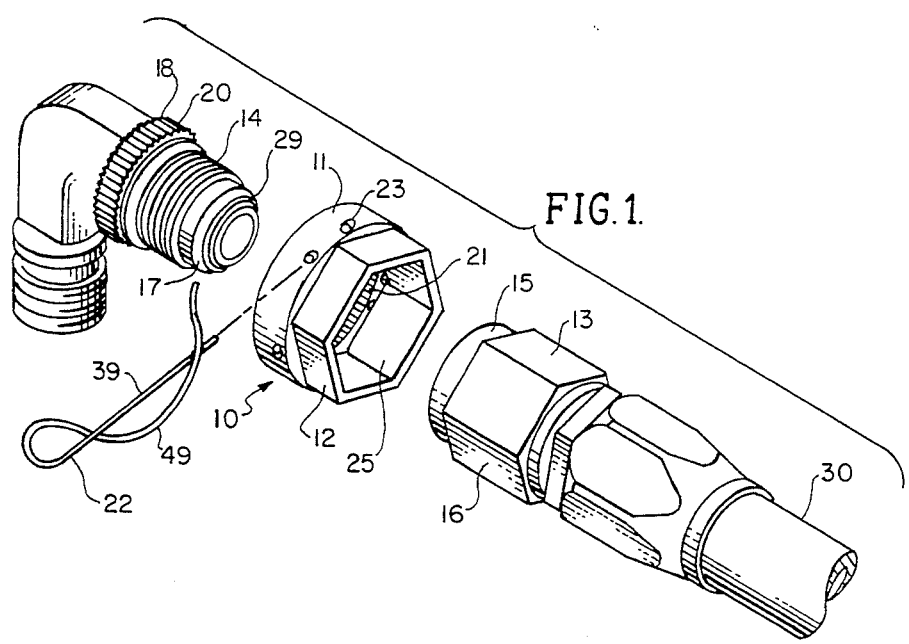
FIG. 1 is an exploded perspective view showing the novel safety retaining device of the present invention.

Referring to FIG. 1, the novel retaining device of the present invention is illustrated in the general direction of arrow 10 which includes a body having a cylindrical portion 11 and a shaped portion 12. The retaining device 10 is intended to be employed in connection with a coupling nut 13 that includes an internal threaded bore which is intended to be screwed or threaded onto the external threads of a coupling member or nipple 14. The coupling nut 13, as is the conventional practice, includes a cylindrical portion 15 which is immediately adjacent to and ahead of a hexagonal configured nut portion 16. The nut portion includes a plurality of flats which is typical of a hexagon nut. Also, the cylindrical portion 15 of the nut includes a tapered entrance leading into the internal threaded bore that is intended to seat and seal against a conformal conical portion 17 carried on the threaded coupling 14. Immediately behind the coupling 14 is a splined collar 18 having a plurality of parallel splines such as spline 20. The extreme end of the cylindrical portion 15 of the nut 13 does not normally bear against collar 20 since to effect a proper seal, the conical surfaces 17 and the tapered bore of the nut 13 and portion 15 effect a seal and prevent the nut moving further along the threaded portion of the nipple.

It is to be particularly noted that the retainer ring 10 includes a bore which is shaped at its cylindrical body end 11 with an internal array of parallel splines 21 of reduced diameter, which is adapted to pass into engagement with the external splines 20 of the collar 18. The thickened portion 12 of the retainer ring 10 includes a hexagon-configured bore with a plurality of flats, such as flat 25, intending to mate with the flats 16 of the nut 13. The thickened portion of the body represented by numeral 12 is substantially lowered from the external surface of the cylindrical portion 11. Each flat is provided with an open-ended aperture as indicated by numeral 23 in FIG. 2 so that the pin portion of safety clip 22 may be passed therethrough in aligned relationship with a mating aperture in an adjacent flat.

Figure 2:
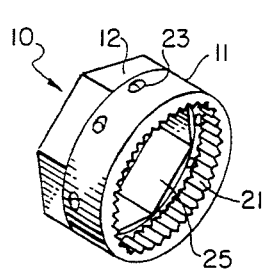
FIG. 2 is a perspective view of the retainer ring component used in the assembly shown in FIG. 1.

As indicated more clearly in FIG. 2, the cylindrical portion 11 of the retainer includes the array of splines 21 which define the open-ended bore adapted to fit over and conform with the splines 20 of the collar 18. The opposite end of the body includes the portion 12 having a shaped bore coaxially disposed with respect to the open-ended bore that is provided with a plurality of flats, such as flat 25 adapted to conform with and mate with the flat 16 on the nut 13.

Figure 3:
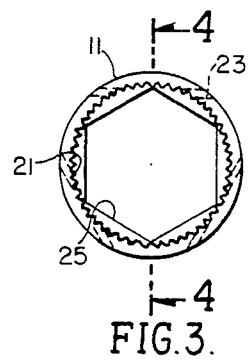
FIG. 3 is a front view of the ring component of the retaining device.

Referring now in detail to FIG. 3, it can be seen that the flats 25 and the circular array of splines 21 are coaxially disposed with respect to one another. It can also be seen that the splines are parallel and are aligned with the shaped flats 25.

Figure 4:
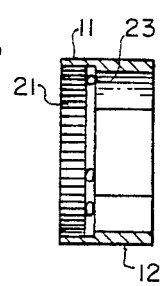
FIG. 4 is a transverse cross-sectional view illustrating the ring component as taken in the direction of arrows 4—4 of FIG. 3.
Figure 5:
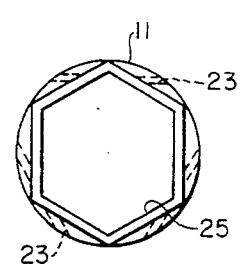
FIG. 5 is a view similar to the view of FIG. 4 as taken in the direction of arrows 5—5 thereof.
Figure 6:
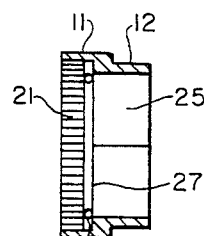
FIG. 6 is a rear elevational view of the ring showing anchoring holes for the safety clip.

In FIG. 4, it may be said that the cylindrical portion 11 defines a splined section of the retainer ring or device 11 and that the shaped nut portion 12 may be defined as a shaped section. The two sections are integral with one another and arranged in series at opposite ends of the open-ended bore of the retainer 11. As shown in FIG. 5, a shoulder 27 is illustrated which is provided by each flat and the shoulder 27 bears against the collar 20 when the retaining ring 11 has been slid over the collar with the respective splines or teeth engaged. Regarding FIG. 6, it can be seen that the respective apertures 23 are in alignment so that when the pin portion 22 of the clip is passed through aligned apertures, an additional lock or shoulder provided by the pin will maintain the ring in its aligned position.

Figure 7:
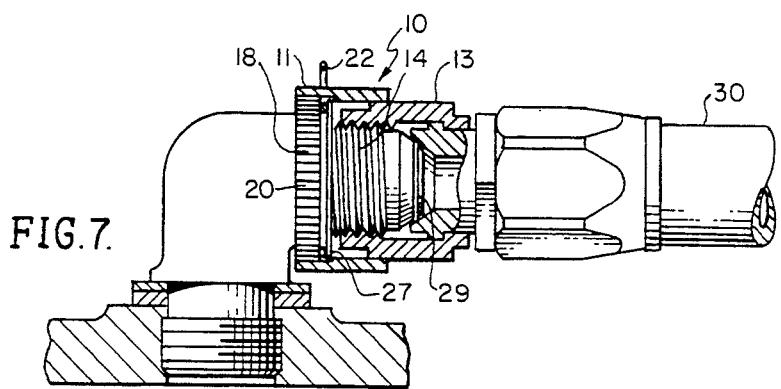
FIG. 7 is a cross-sectional view of the retaining device components in a typical installation in a fuel system.

Referring now in detail to FIG. 7, an actual installation of the inventive retainer ring 10 is illustrated in a typical fuel line system. A fuel line 30 is connected to the nipple 14 by means of the nut 13 joining the threaded end of the nipple. It can be seen that as the nut 13 is turned or torqued, the retaining ring 11 will turn with the nut as long as the splines are not engaged. When the proper amount of torque has been reached, turning stops and the retaining ring 11 is urged towards collar 18 so that the splines 20 and 21 will engage. In the event that alignment cannot be achieved, the ring 11 can be backed-off slightly until the splines can be mated in alignment at which time the ring can now be moved to the left to effect engagement. The facing of the collar 18 will bear against the shoulders 27 so that the ring is seated on the collar. A small annular space is provided between the facing of collar 18 and the opposing facing of the nut 13. The apertures 23 are in alignment with this facing and the pin 22 of the clip is passed through aligned openings or apertures 23 so that the pin occupies a portion of the annular space. Also, since the hexagon flats 25 of the ring 11 are in alignment or mesh with the flats 16 on the nut 13, the nut 13 cannot rotate since the nut is held in position by the anchored retaining ring 11 and locked in place by the pin or clip 22.

In actual operation, the sleeve or ring 10 is slipped onto the nut 13. The nut is then engaged with the threaded nipple and turned to maximum torque where rotation is then stopped. The sleeve or ring 10 is advanced so that the splines are mated and engaged respectively between the splines 20 and 21. If misalignment is experienced, the sleeve or ring is backed-off the nut slightly so that the sleeve or ring is disconnected and then this is followed by re-connecting the splines of the sleeve and the nipple collar. In any event, it is important that the user does not go beyond maximum torque. Always reverse the nut and collar for alignment of the splines. Such reverse movement is very slight since the splines are of small dimension and the space therebetween equally small so as to accommodate alignment with slight movement for backing off of the nut and ring.

Installation of the spring clip 22 requires two motions. The first motion is a straight push of the linear segment 39 followed by a twist or rotation of the semicircular segment 49. The spring action provides a self-biasing twist which causes the semicircular segment to roll into a secure position.

Figure 8:
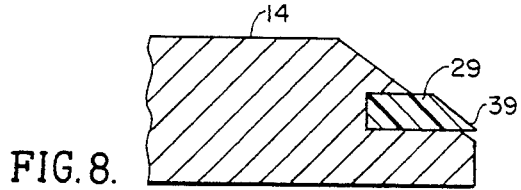
FIG. 8 is an enlarged fragmentary view, in section, of the seal disposed of the sloping face of nipple 14.
Figure 9:
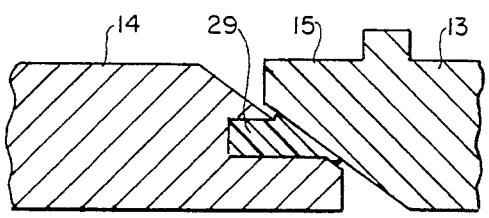
FIG. 9 is a view similar to that of FIG. 10 illustrating assembly of the nipple with the joining nut.

An elastometric seal 29 is shown in FIGS. 8 and 9 which is interposed between the nipple 14 and nut 13. The seal, in combination with the inventive locking device, makes it possible to lock and seal the connection by hand over a wide range of pressures. The seal includes an exposed flap 39 which is forced against mated surfaces of the nipple and nut. The forces show the flap deformed in FIG. 9 at both its top and bottom so that the sloping or tapered surfaces of the nipple and nut are maintained parallel.

While particular embodiments of the present invention have been shown and de,scribed, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a safety retainer ring assembly in combination with a shaped nut threadably carried on a coupling and engageable with a threaded nipple, the improvement which comprises:
   a retainer ring having an annular body with an open-ended bore configured at one internal end to conform with said shape of said shaped nut and raised shoulders projecting into said bore;
   a supporting structure;
   said nipple having an external collar provided with a plurality of splines arranged in parallel spaced-apart relationship;
   said retainer ring having a plurality of parallel internal splines disposed in said bore at said bore end opposite to said bore end carrying said shaped end;
   said bore splines and said collar splines selectively mateable to prevent rotation of said ring;
   a plurality of apertures provided in said ring at its shaped end;
   a resilient clip adapted to be inserted through selected ones of said plurality of apertures disposed between said collar and said nut;
   said ring is slideably carried on said coupling; and
   said ring includes, internal shoulders engageable with said collar to prevent said ring from sliding on said collar after threaded engagement of said nut with said threaded nipple.

2. The invention as defined in claim 1 including:
   a resilient seal carried on said nipple compressible against said shaped nut by hand pressure.

3. The invention as defined in claim 2 wherein:
   said seal includes an exposed flap expandable at its top and bottom under pressure to enlarge a sealing area between said nipple and said shaped nut.

4. The invention as defined in claim 3 wherein:
   said nipple and said shaped nut have opposing parallel sloping surfaces separated by said seal flap.

5. A splined safety lock for a threaded coupling comprising:
   a retainer ring having an open-ended bore defining an internal passageway between its opposite ends;
   one end of said retainer ring passageway terminating in an edge marginal region carrying a plurality of internal flats shaped to define a hexagon;
   said other end of said retainer ring passageway terminating in a second edge marginal region carrying a plurality of splines arranged in fixed parallel spaced-apart relationship;
   said splines in parallel alignment with the central longitudinal axis of said passageway and terminating with said plurality of flats;
   each of said plurality of flats having an aperture therethrough with selected ones of said apertures in linear alignment; and
   said retainer ring having a plurality of shoulders disposed at the end of said flats terminating with said splines and said shoulders raised above said splines.

* * * * *